United States Patent
Kojima

(10) Patent No.: US 12,523,273 B2
(45) Date of Patent: Jan. 13, 2026

(54) ANTI-VIBRATION DEVICE

(71) Applicant: Prospira Corporation, Kawasaki (JP)

(72) Inventor: Hiroshi Kojima, Kawasaki (JP)

(73) Assignee: Prospira Corporation, Kawasaki (JP)

( * ) Notice: Subject to any disclaimer, the term of this patent is extended or adjusted under 35 U.S.C. 154(b) by 407 days.

(21) Appl. No.: 18/246,853

(22) PCT Filed: Sep. 24, 2021

(86) PCT No.: PCT/JP2021/035175
§ 371 (c)(1),
(2) Date: Mar. 28, 2023

(87) PCT Pub. No.: WO2022/075097
PCT Pub. Date: Apr. 14, 2022

(65) Prior Publication Data
US 2023/0358292 A1 Nov. 9, 2023

(30) Foreign Application Priority Data
Oct. 8, 2020 (JP) .................. 2020-170273

(51) Int. Cl.
*F16F 13/10* (2006.01)
*B60K 5/12* (2006.01)

(52) U.S. Cl.
CPC ............ *F16F 13/10* (2013.01); *B60K 5/1208* (2013.01); *F16F 2224/0208* (2013.01); *F16F 2230/0005* (2013.01)

(58) Field of Classification Search
None
See application file for complete search history.

(56) References Cited

U.S. PATENT DOCUMENTS 5,964,456 A 10/1999 Someya
6,120,011 A 9/2000 Maeno et al.
(Continued)

FOREIGN PATENT DOCUMENTS

CN 102975604 A 3/2013
CN 107002795 A 8/2017
(Continued)

OTHER PUBLICATIONS

JP-4603015-B2: English Machine Translation (Year: 2010).*
(Continued)

*Primary Examiner* — Melanie Torres Williams
(74) *Attorney, Agent, or Firm* — KENJA IP LAW PC

(57) ABSTRACT

Included are a tubular bracket configured to be connected to one of a vibration generating portion and a vibration receiving portion and a first attachment member configured to be connected to the other, a tubular second attachment member inserted inside the bracket, and an elastic body connecting the first attachment member and the second attachment member. An inner circumferential surface of one end portion of the bracket including one end in an axial direction along a central axis has formed thereon a first portion against which an outer circumferential surface of the second attachment member is pressed, and a second portion that is positioned farther towards the one end in the axial direction than the first portion, has a larger inner diameter than the first portion, and abuts against or is in proximity with the outer circumferential surface of the second attachment member.

3 Claims, 3 Drawing Sheets

(56) References Cited

U.S. PATENT DOCUMENTS

| | | | |
|---|---|---|---|
| 6,390,458 B2* | 5/2002 | Okanaka | F16F 13/105 |
| | | | 267/140.11 |
| 8,770,560 B2* | 7/2014 | Kanaya | F16F 13/108 |
| | | | 267/140.14 |
| 2013/0056918 A1 | 3/2013 | Kim et al. | |
| 2017/0211647 A1 | 7/2017 | Komiya | |

FOREIGN PATENT DOCUMENTS

| | | | |
|---|---|---|---|
| EP | 3521655 A1 | 8/2019 | |
| EP | 3032136 B1 | 10/2019 | |
| JP | 2000002298 A | 1/2000 | |
| JP | 2004211810 A | 7/2004 | |
| JP | 2007278399 A | 10/2007 | |
| JP | 4603015 B2 * | 12/2010 | |
| JP | 2017067157 A | 4/2017 | |
| JP | 2018053945 A | 4/2018 | |

OTHER PUBLICATIONS

JP-2017-067157-A (Komiya Y): English Machine Translation (Year: 2017).*

Apr. 21, 2025, search result of Office Action issued by the China National Intellectual Property Administration in the corresponding Chinese Patent Application No. 202180068707.4.

Oct. 26, 2021, International Search Report issued in the International Patent Application No. PCT/JP2021/035175.

Sep. 13, 2024, search result of the Extended European Search Report issued by the European Patent Office in the corresponding European Patent Application No. 21877398.4.

Mar. 28, 2023, International Preliminary Report on Patentability issued in the International Patent Application No. PCT/JP2021/035175.

Oct. 13, 2025, search result of the Office Action issued by the China National Intellectual Property Administration in the corresponding Chinese Patent Application No. 202180068707.4.

* cited by examiner

ANTI-VIBRATION DEVICE

TECHNICAL FIELD

The present disclosure relates to an anti-vibration device.

The present application claims priority to Japanese Patent Application No. 2020-170273 filed on Oct. 8, 2020, the entire contents of which are incorporated herein by reference.

BACKGROUND

A known anti-vibration device, such as the one illustrated in Patent Literature (PTL) 1, includes a bracket configured to be connected to one of a vibration generating portion and a vibration receiving portion and a first attachment member configured to be connected to the other, a tubular second attachment member mounted on the bracket, and an elastic body connecting the first attachment member and the second attachment member.

In a known configuration for this type of anti-vibration device, the second attachment member is pressed-fitted in one end of a cylindrical bracket in the axial direction along the central axis.

CITATION LIST

Patent Literature

PTL 1: JP 2000-2298 A

SUMMARY

Technical Problem

However, in the aforementioned conventional anti-vibration device, one end of the bracket in the axial direction may be susceptible to breakage due to residual stress created when the second attachment member is press-fitted.

The present disclosure has been conceived in light of such circumstances and aims to provide an anti-vibration device that can ensure the durability of the bracket.

Solution to Problem

To solve the aforementioned problem and achieve this aim, an anti-vibration device according to an aspect of the present disclosure includes a tubular bracket configured to be connected to one of a vibration generating portion and a vibration receiving portion and a first attachment member configured to be connected to the other, a tubular second attachment member inserted inside the bracket, and an elastic body connecting the first attachment member and the second attachment member, wherein an inner circumferential surface of one end portion of the bracket including one end in an axial direction along a central axis has formed thereon a first portion against which an outer circumferential surface of the second attachment member is pressed, and a second portion that is positioned farther towards the one end in the axial direction than the first portion, has a larger inner diameter than the first portion, and abuts against or is in proximity with the outer circumferential surface of the second attachment member.

Advantageous Effect

According to the anti-vibration device of the present disclosure, the durability of the bracket can be ensured.

DETAILED DESCRIPTION

Figure 1:
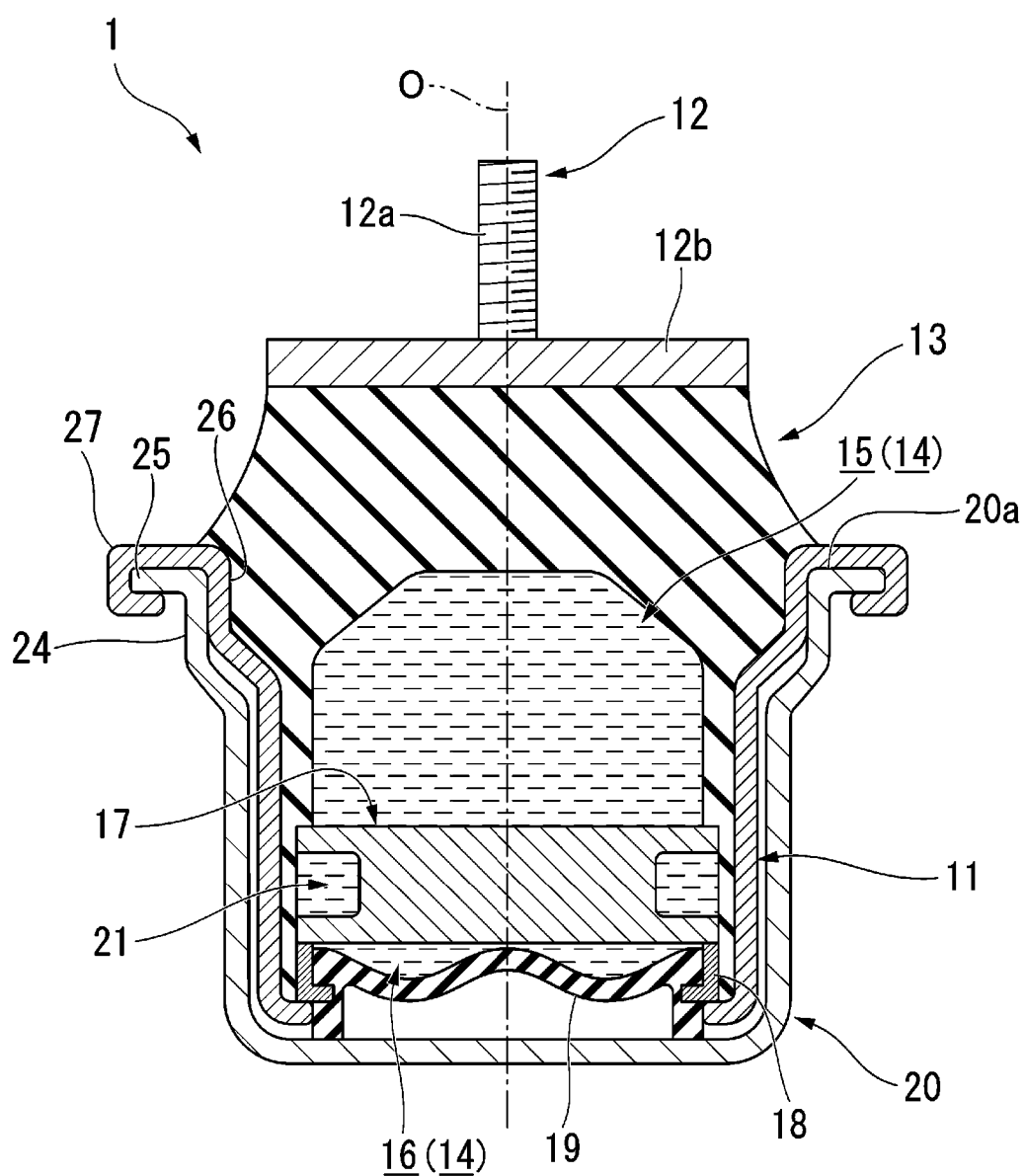
FIG. 1 is a vertical cross-sectional view of an anti-vibration device illustrated as an embodiment according to the present disclosure.

An embodiment of an anti-vibration device according to the present disclosure is described below with reference to FIGS. 1 and 2.

An anti-vibration device 1 in the present embodiment includes a tubular bracket 20 configured to be connected to one of a vibration generating portion and a vibration receiving portion and a first attachment member 12 configured to be connected to the other, a tubular second attachment member 11 inserted inside the bracket 20, an elastic body 13 connecting the first attachment member 12 and the second attachment member 11, a separating member 17 separating a liquid chamber 14 within the second attachment member 11, in which liquid is to be enclosed, in the axial direction along the central axis O of the second attachment member 11 into a main liquid chamber 15 having a portion of the elastic body 13 as a dividing wall and an auxiliary liquid chamber 16, and a diaphragm 19 forming a portion of a dividing wall for the auxiliary liquid chamber 16. The second attachment member 11 is configured to be connected to one of the vibration generating portion and the vibration receiving portion via the bracket 20.

When the anti-vibration device 1 is used as an engine mount for an automobile, for example, the bracket 20 is connected to the vehicle body acting as the vibration receiving portion, and the first attachment member 12 is connected to the engine acting as the vibration generating portion. This suppresses the transmission of engine vibration to the vehicle body.

The anti-vibration device 1 may, for example, be used as a suspension bushing for automobiles or a mount for industrial machinery installed in factories.

In the present embodiment, the main liquid chamber 15 side of the separating member 17 in the axial direction is referred to as the upper side, and the auxiliary liquid chamber 16 side is referred to as the lower side. In a plan view of the anti-vibration device 1 from the axial direction, the direction intersecting the central axis O is referred to as the radial direction, and the direction about the central axis O is referred to as the circumferential direction.

The first attachment member 12 includes a connecting plate 12b whose front and back surfaces face the axial direction and a mounting shaft 12a extending upward from the connecting plate 12b. The connecting plate 12b and the mounting shaft 12a have a circular shape when viewed from the axial direction and are arranged coaxially with the central axis O. The lower surface of the connecting plate 12*b* is bonded by vulcanization to the upper end surface of the elastic body 13.

The second attachment member 11 is positioned below the first attachment member 12. The second attachment member 11 is cylindrical in shape and is arranged coaxially with the central axis O. The inner circumferential surface of the second attachment member 11 is covered with coating rubber. The coating rubber is integrally formed with the elastic body 13.

The elastic body 13 is made of rubber material to be elastically deformable and closes the upper opening of the second attachment member 11. The elastic body 13 is bonded by vulcanization to the inner circumferential surface of the second attachment member 11.

The diaphragm 19 is made of rubber material to be deformable and closes the lower opening of the second attachment member 11. The outer edge of the diaphragm 19 is bonded by vulcanization to a diaphragm ring 18. The diaphragm ring 18 is fitted inside the lower end of the second attachment member 11. The diaphragm ring 18 is secured inside the lower end of the second attachment member 11 by the lower end of the second attachment member 11 being crimped inward in the radial direction.

The inside of the second attachment member 11 is closed off by the elastic body 13 and the diaphragm 19 to define the liquid chamber 14 in which a liquid is sealed. Water or ethylene glycol, for example, can be used as the liquid.

The separating member 17 is formed in the shape of a flat disk and is fitted inside the second attachment member 11. As a result, the liquid chamber 14 in the second attachment member 11 is separated into the main liquid chamber 15 defined by the elastic body 13 and the separating member 17 and the auxiliary liquid chamber 16 defined by the diaphragm 19 and the separating member 17. The diaphragm 19 expands and contracts as the liquid flows into and out of the auxiliary liquid chamber 16.

A restricting passage 21 that connects the main liquid chamber 15 and the auxiliary liquid chamber 16 is formed in the separating member 17. The restricting passage 21 is connected to the main liquid chamber 15 and the auxiliary liquid chamber 16 through a non-illustrated main liquid chamber side opening and auxiliary liquid chamber side opening formed in the separating member 17.

When vibration is inputted to the anti-vibration device 1, the elastic body 13 deforms elastically and the diaphragm 19 expands and contracts as the liquid circulates between the main liquid chamber 15 and the auxiliary liquid chamber 16 through the restricting passage 21, thereby damping and absorbing the vibration.

Figure 2:
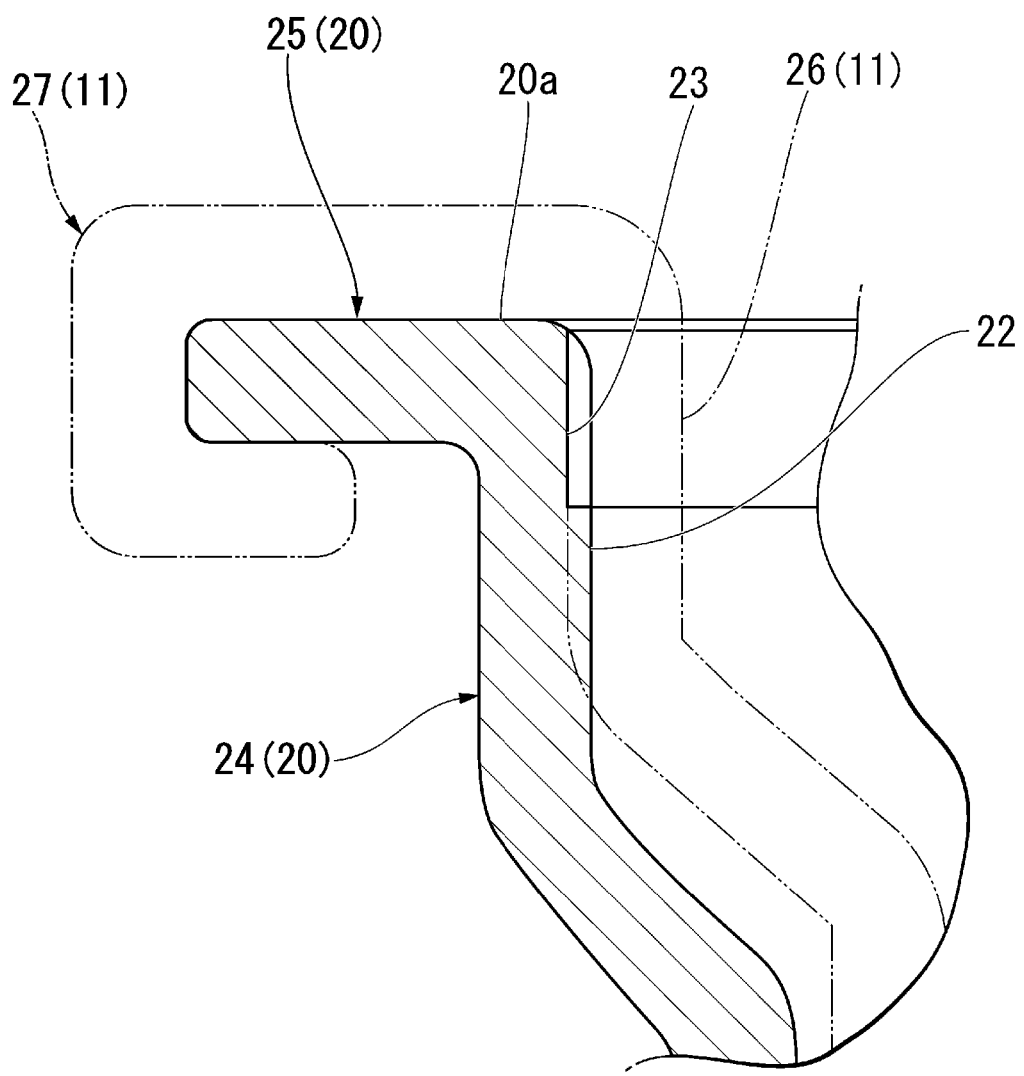
FIG. 2 is an enlarged vertical cross-sectional view of a bracket of the anti-vibration device illustrated as an embodiment according to the present disclosure.

In the present embodiment, on the inner circumferential surface of one end portion of the bracket 20 including one end in the axial direction, a first portion 22 against which the outer circumferential surface of the second attachment member 11 is pressed and a second portion 23 that is positioned farther towards the one end in the axial direction than the first portion 22, has a larger inner diameter than the first portion 22, and abuts against or is in proximity with the outer circumferential surface of the second attachment member 11 are formed, as illustrated in FIG. 2. The one end portion of the bracket 20 in the axial direction is the end portion on the same side as the below-described one end in the axial direction of a first fitting tube 24, one end in the axial direction of the second attachment member 11, and one end in the axial direction of a second fitting tube 26.

The first portion 22 and the second portion 23 are formed on the inner circumferential surface of the upper end portion of the bracket 20. The second portion 23 is positioned above the first portion 22. The second portion 23 is connected to an upper opening edge 20*a* of the bracket 20 (the opening edge at one end portion in the axial direction). The second portion 23 is connected to the first portion 22.

The first portion 22 and the second portion 23 may be formed on the inner circumferential surface of the lower end portion of the bracket 20. The second portion 23 and at least one of the upper opening edge 20*a* and the first portion 22 of the bracket 20 may be separated in the axial direction.

The second portion 23 abuts against the outer circumferential surface of the second attachment member 11 with a weaker tightening force than the first portion 22. The inner diameter of the second portion 23 is the same as the outer diameter of the portion of the outer circumferential surface of the second attachment member 11 that is radially opposite the second portion 23. The inner diameter of the second portion 23 may be different from the outer diameter of the portion of the outer circumferential surface of the second attachment member 11 that is radially opposite the second portion 23.

The sizes of each of the first portion 22 and the second portion 23 in the axial direction are equivalent to each other. The sizes of each of the first portion 22 and the second portion 23 in the axial direction may be different from each other.

The difference between the inner diameter of the second portion 23 and the inner diameter of the first portion 22 is, for example, 0.2 mm to 1.0 mm.

If the difference is less than 0.2 mm, large residual stress may occur in the second portion 23 when the second attachment member 11 is press-fitted into the upper end portion of the bracket 20. If the difference exceeds 1.0 mm, it may be easier for a substance such as water, for example, to enter between the inner circumferential surface of the upper end portion of the bracket 20 and the outer circumferential surface of the second attachment member 11 from outside the anti-vibration device 1, and it may be difficult to secure the wall thickness of the upper end portion of the bracket 20.

The upper end portion of the bracket 20 includes a first fitting tube 24 extending in the axial direction and having the first portion 22 and the second portion 23 formed on the inner circumferential surface, and a first flange 25 protruding radially outward from the upper end portion of the first fitting tube 24 in the axial direction (one end portion in the axial direction). The upper surface of the first flange 25 is flush with the upper opening edge of the first fitting tube 24. The upper surface of the first flange 25 and the upper opening edge of the first fitting tube 24 configure the upper opening edge 20*a* of the bracket 20.

The upper end of the second attachment member 11 (one end portion in the axial direction) includes a second fitting tube 26 extending in the axial direction and fitted inside the first fitting tube 24, and a second flange 27 protruding radially outward from the upper end portion of the second fitting tube 26 (one end portion in the axial direction). The upper surface of the second flange 27 is flush with the upper opening edge of the second fitting tube 26. The lower surface of the second flange 27 abuts against the upper opening edge 20*a* of the bracket 20. The second flange 27 and the first flange 25 each extend continuously over the entire circumferential length.

One of the first flange 25 and the second flange 27 straddles the outer circumferential edge of the other in the axial direction and pinches the other in the axial direction. In the present embodiment, the second flange 27 pinches the first flange 25 in the axial direction. In other words, the second flange 27 is placed on top of the first flange 25 and bent down to straddle the outer circumferential edge of the first flange 25 downward. The second flange 27 is then bent radially inward to pinch the first flange 25 from both sides in the axial direction, thereby being wound around the first flange 25.

The first flange 25 may pinch the second flange 27 in the axial direction.

Figure 3:
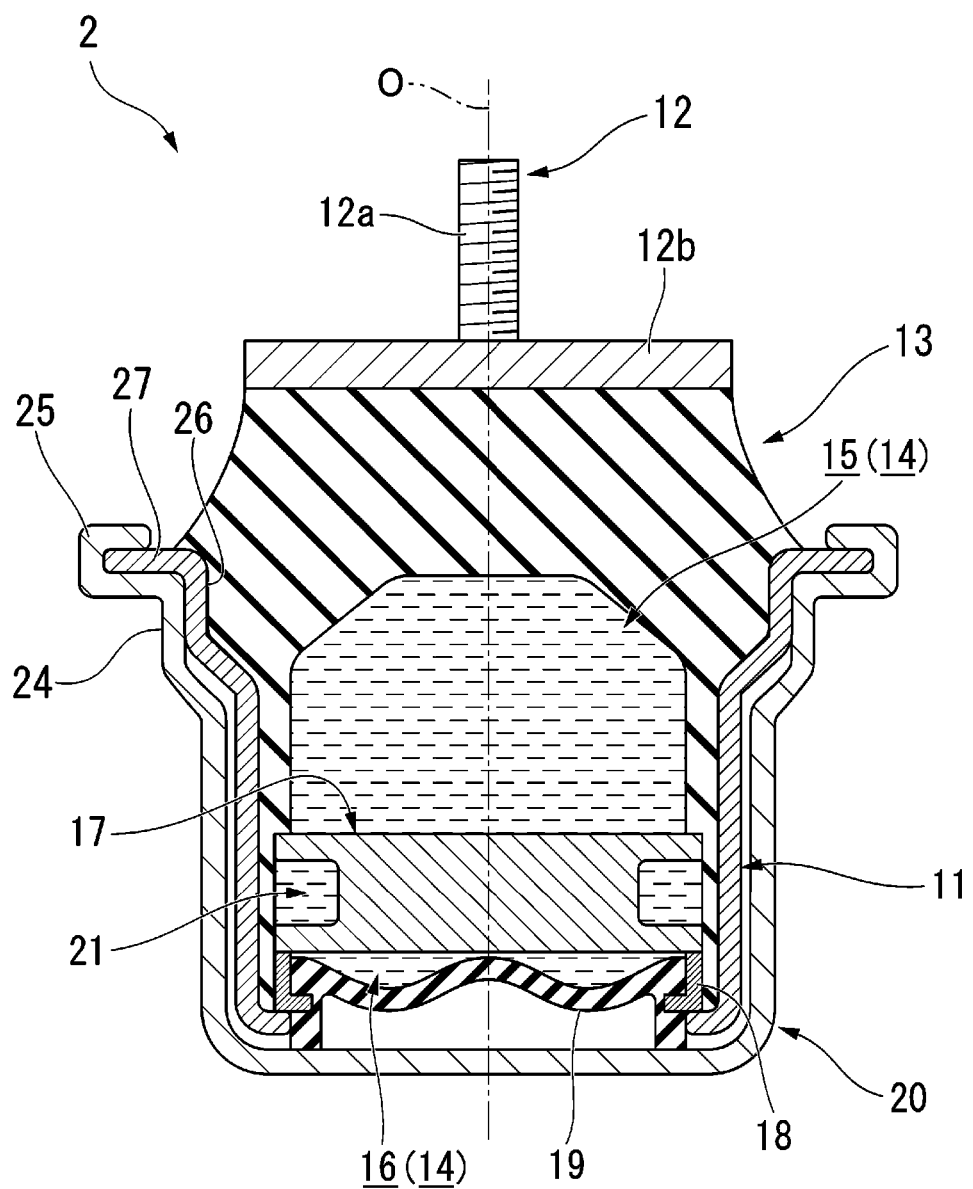
FIG. 3 is a vertical cross-sectional view of an anti-vibration device illustrated as a variation according to the present disclosure.

In other words, as illustrated in FIG. 3, while supporting the bottom surface of the second flange 27, the first flange 25 may be bent up to straddle the outer circumferential edge of the second flange 27 upward. The first flange may then be bent radially inward to pinch the second flange 27 from both sides in the axial direction, thereby being wound around the second flange 27.

The bracket 20 is formed of an aluminum alloy, for example. The bracket 20 is formed by die casting, for example. The bracket 20 may be formed of other materials, such as carbon steel, for example.

The second attachment member 11 is formed of aluminum alloy or carbon steel, for example. The second attachment member 11 may be formed of the same material as the bracket 20 or may be formed of a material that differs from the bracket 20 in rigidity, for example.

The anti-vibration device 1 configured as described above is obtained by press-fitting the second attachment member 11 within the upper end portion of the bracket 20, with the liquid chamber 14 having been filled with liquid, and subsequently winding the second flange 27 around the first flange 25 as described above.

As explained above, according to the anti-vibration device 1 in the present embodiment, not only the first portion 22, against which the outer circumferential surface of the second attachment member 11 is pressed, but also the second portion 23, which has a larger inner diameter than the first portion 22, is formed on the inner circumferential surface of the upper end portion of the bracket 20. This enables a reduction in residual stress generated in the area of the upper end portion of the bracket 20 where the second portion 23 is located, thereby preventing the upper end portion of the bracket 20 from being easily damaged due to residual stress.

The second portion 23 is positioned above the first portion 22, making it possible to move the first portion 22, against which the outer circumferential surface of the second attachment member 11 is pressed, away from the upper opening edge 20a of the bracket 20 in the axial direction. Even if the upper opening edge 20a of the bracket 20 were configured to collide, for example, with another member, the load due to the collision or the like and the residual stress in the first portion 22 would be divided in the axial direction by the second portion 23, making it harder for a portion with concentrated stress to occur in the upper end portion of the bracket 20.

Since the second portion 23 is positioned above the first portion 22, the second attachment member 11 can also be easily press-fitted into the upper end portion of the bracket 20 with little snagging.

The second portion 23 abuts against or is in proximity with the outer circumferential surface of the second attachment member 11. Therefore, the formation of the second portion 23 on the inner circumferential surface of the upper end portion of the bracket 20 can prevent water, for example, from entering easily between the inner circumferential surface of the upper end portion of the bracket 20 and the outer circumferential surface of the second attachment member 11 from outside the anti-vibration device 1.

One of the first flange 25 of the bracket 20 and the second flange 27 of the second attachment member 11 straddles the outer circumferential edge of the other in the axial direction and pinches the other in the axial direction. Therefore, despite the provision of the second portion 23, the second attachment member 11 can be strongly secured to the bracket 20 without increasing the tightening margin at the first portion 22, and the durability of the bracket 20 can be ensured.

The second portion 23 is connected to the upper opening edge 20a of the bracket 20. Therefore, even if the upper opening edge 20a of the bracket were configured to collide, for example, with another member, the load due to the collision or the like and the residual stress in the first portion 22 would be divided reliably in the axial direction by the second portion 23. In addition, the second attachment member 11 can be more easily press-fitted into the upper end portion of the bracket 20.

The second portion 23 abuts against the outer circumferential surface of the second attachment member 11 with a weaker tightening force than the first portion 22. This can reliably prevent water, for example, from entering easily between the inner circumferential surface of the upper end portion of the bracket 20 and the outer circumferential surface of the second attachment member 11 from outside the anti-vibration device 1.

The bracket 20 is formed of an aluminum alloy, thereby reducing the weight. Even if this reduces the rigidity, the upper end portion of the bracket is prevented from being easily damaged due to residual stress, as described above, and durability can be secured, thereby significantly achieving the aforementioned effects.

The technical scope of the present disclosure is not limited to the aforementioned embodiments, and various changes can be made without departing from the spirit of the present disclosure.

For example, the anti-vibration device 1 may be configured without the liquid chamber 14, the separating member 17, and the diaphragm 19.

Other components in the aforementioned embodiments may be replaced with well-known components without departing from the spirit of the present disclosure, and the aforementioned embodiments and variations may be combined as appropriate.

According to the aforementioned aspect of the present disclosure, not only the first portion (22) against which the outer circumferential surface of the second attachment member (11) is pressed, but also the second portion (23), which has a larger inner diameter than the first portion (22), is formed on the inner circumferential surface of the bracket (20) at one end portion in the axial direction. This enables a reduction in residual stress generated in the area of the one end portion of the bracket in the axial direction where the second portion is located, thereby preventing the one end portion of the bracket in the axial direction from being easily damaged due to residual stress.

The second portion is positioned farther towards one end portion in the axial direction than the first portion, making it possible to move the first portion, against which the outer circumferential surface of the second attachment member is pressed, away in the axial direction from the opening edge of the bracket at one end portion in the axial direction. Even if the opening edge of the bracket at one end portion in the axial direction were configured to collide, for example, with another member, the load due to the collision or the like and the residual stress in the first portion would be divided in the axial direction by the second portion, making it harder for a portion with concentrated stress to occur in one end portion of the bracket in the axial direction.

Since the second portion is positioned farther towards one end portion in the axial direction than the first portion, the second attachment member can also be easily press-fitted into one end portion of the bracket with little snagging.

The second portion abuts against or is in proximity with the outer circumferential surface of the second attachment member. Therefore, the formation of the second portion on the inner circumferential surface of the bracket at one end portion in the axial direction can prevent water, for example, from entering easily between the inner circumferential surface of the bracket at one end portion in the axial direction and the outer circumferential surface of the second attachment member from outside the anti-vibration device.

In the aforementioned aspect, the one end portion of the bracket in the axial direction may include a first fitting tube extending in the axial direction and having the first portion and the second portion formed on an inner circumferential surface, and a first flange protruding radially outward from one end portion of the first fitting tube in the axial direction, an end portion of the second attachment member in the axial direction may include a second fitting tube extending in the axial direction and fitted inside the first fitting tube, and a second flange protruding radially outward from one end portion of the second fitting tube in the axial direction, and one of the first flange and the second flange may straddle an outer circumferential edge of the other in the axial direction and pinch the other in the axial direction.

In this case, one of the first flange of the bracket and the second flange of the second attachment member straddles the outer circumferential edge of the other in the axial direction and pinches the other in the axial direction, and therefore, despite the provision of the second portion, the second attachment member can be strongly secured to the bracket without increasing the tightening margin at the first portion, and the durability of the bracket can be ensured.

In the aforementioned aspect, the second portion may be connected to an opening edge of the bracket at the one end portion in the axial direction.

In this case, the second portion is connected to an opening edge of the bracket at the one end portion in the axial direction, and therefore, even if the opening edge of the bracket at one end portion in the axial direction were configured to collide, for example, with another member, the load due to the collision or the like and the residual stress in the first portion would be divided reliably in the axial direction by the second portion. In addition, the second attachment member can be more easily press-fitted into the one end portion of the bracket in the axial direction.

In the aforementioned aspect, the second portion may abut against the outer circumferential surface of the second attachment member with a weaker tightening force than the first portion.

In this case, the second portion abuts against the outer circumferential surface of the second attachment member with a weaker tightening force than the first portion, which can reliably prevent water, for example, from entering easily between the inner circumferential surface of the bracket at one end portion in the axial direction and the outer circumferential surface of the second attachment member from outside the anti-vibration device.

In the aforementioned aspect, the bracket may be formed of an aluminum alloy.

In this case, the bracket is formed of an aluminum alloy, thereby reducing the weight. Even if this reduces the rigidity, one end portion of the bracket in the axial direction is prevented from being easily damaged due to residual stress, as described above, and durability can be secured, thereby significantly achieving the aforementioned effects.

INDUSTRIAL APPLICABILITY

The present disclosure can be used in an anti-vibration device that includes a bracket configured to be connected to one of a vibration generating portion and a vibration receiving portion and a first attachment member configured to be connected to the other, and in which a second attachment member is inserted inside the bracket.

REFERENCE SIGNS LIST 1, 2 Anti-vibration device
11 Second attachment member
12 First attachment member
13 Elastic body
20 Bracket
20a Upper opening edge (opening edge)
22 First portion
23 Second portion
24 First fitting tube
25 First flange
26 Second fitting tube
27 Second flange
O Central axis

The invention claimed is:

1. An anti-vibration device comprising:
a tubular bracket configured to be connected to one of a vibration generating portion and a vibration receiving portion and a first attachment member configured to be connected to the other;
a tubular second attachment member inserted inside the bracket; and
an elastic body connecting the first attachment member and the second attachment member, wherein
an inner circumferential surface of one end portion of the bracket including one end in an axial direction along a central axis has formed thereon
a first portion against which an outer circumferential surface of the second attachment member is pressed, and
a second portion that is positioned farther towards the one end in the axial direction than the first portion, has a larger inner diameter than the first portion, abuts against or is in proximity with the outer circumferential surface of the second attachment member, and abuts against the outer circumferential surface of the second attachment member with a weaker tightening force than the first portion;
the one end portion of the bracket in the axial direction includes,
a first fitting tube extending in the axial direction and having the first portion and the second portion formed on an inner circumferential surface, and
a first flange protruding radially outward from one end portion of the first fitting tube in the axial direction;
an end portion of the second attachment member in the axial direction includes,
a second fitting tube extending in the axial direction and fitted inside the first fitting tube, and
a second flange protruding radially outward from one end portion of the second fitting tube in the axial direction; and one of the first flange and the second flange straddles an outer circumferential edge of the other in the axial direction and pinches the other in the axial direction.

2. The anti-vibration device according to claim 1, wherein the second portion is connected to an opening edge of the bracket at the one end portion in the axial direction.

3. The anti-vibration device according to claim 1, wherein the bracket is formed of an aluminum alloy.

\* \* \* \* \*